US012695173B2

(12) United States Patent
Su et al.

(10) Patent No.: US 12,695,173 B2
(45) Date of Patent: Jul. 28, 2026

(54) ANTENNA SYSTEM WITH SWITCHABLE HORIZONTAL HALF-POWER BEAMWIDTH

(71) Applicant: Alpha Networks Inc., Hsinchu City (TW)

(72) Inventors: De-Chang Su, Hsinchu City (TW); Kuang-Wei Lin, Hsinchu City (TW)

(73) Assignee: Alpha Networks Inc., Hsinchu City (TW)

( * ) Notice: Subject to any disclaimer, the term of this patent is extended or adjusted under 35 U.S.C. 154(b) by 107 days.

(21) Appl. No.: 18/747,356

(22) Filed: Jun. 18, 2024

(65) Prior Publication Data

US 2025/0141090 A1 May 1, 2025

(30) Foreign Application Priority Data

Oct. 25, 2023 (TW) ................................ 112140927

(51) Int. Cl.
*H01Q 1/22* (2006.01)
*H01Q 1/48* (2006.01)
*H01Q 21/06* (2006.01)

(52) U.S. Cl.
CPC ............ *H01Q 1/2283* (2013.01); *H01Q 1/48* (2013.01); *H01Q 21/065* (2013.01)

(58) Field of Classification Search
CPC ...... H01Q 1/2283; H01Q 1/48; H01Q 15/147; H01Q 21/065; H01Q 25/002; H01Q 9/0407; H01Q 9/065
See application file for complete search history.

(56) References Cited

U.S. PATENT DOCUMENTS 6,384,797 B1 5/2002 Schaffner
7,460,073 B2 * 12/2008 Schillmeier .......... H01Q 1/2216 340/572.1
2004/0227667 A1 11/2004 Sievenpiper
2006/0071859 A1 * 4/2006 Condon .............. H01Q 1/2258 343/700 MS (Continued)

FOREIGN PATENT DOCUMENTS

CN 104124513 A 10/2014
CN 104283004 A 1/2015

(Continued)

*Primary Examiner* — Thien M Le
(74) *Attorney, Agent, or Firm* — C.I.P.O. IP GROUP

(57) ABSTRACT

An antenna system with a switchable horizontal half-power beamwidth includes: a ground plane module including rows of patch groups that jointly form a ground plane; an antenna unit spaced apart from the ground plane by an interval; and a control module that can receive at least one beam control message. Each two adjacent rows of the patch groups are provided therebetween with at least one switching unit. The control module can bring each of the at least one switching unit to be turned on or turned off according to contents of the at least one beam control message, so as to adjust the electrical properties of the ground plane and change the horizontal half-power beamwidth of the antenna unit. Accordingly, the antenna system has a relatively low-profile spatial property, and requires no extra mechanism design for horizontal half-power beamwidth adjustment and switching based on practical needs.

10 Claims, 9 Drawing Sheets

(56) References Cited

U.S. PATENT DOCUMENTS

| | | | | |
|---|---|---|---|---|
| 2008/0218417 | A1* | 9/2008 | Gillette | H01Q 9/0414 343/700 MS |
| 2014/0198013 | A1* | 7/2014 | Saraswat | H01L 23/5225 343/893 |
| 2015/0084826 | A1* | 3/2015 | Lea | H01Q 25/00 343/853 |
| 2021/0066805 | A1* | 3/2021 | Flores-Cuadras | H01Q 1/38 |
| 2022/0247082 | A1* | 8/2022 | Parsche | H01Q 5/40 |
| 2022/0321161 | A1* | 10/2022 | Kinpara | H04B 1/40 |
| 2024/0141090 | A1* | 5/2024 | Akai | C08J 5/04 |
| 2024/0250430 | A1* | 7/2024 | Kubwimana | H01Q 9/045 |
| 2024/0429623 | A1* | 12/2024 | Suh | H01Q 21/062 |

FOREIGN PATENT DOCUMENTS

| | | | |
|---|---|---|---|
| CN | 111370853 | A | 7/2020 |
| CN | 111430914 | A | 7/2020 |
| CN | 115668641 | A | 1/2023 |
| TW | 201635647 | A | 10/2016 |

* cited by examiner

ANTENNA SYSTEM WITH SWITCHABLE HORIZONTAL HALF-POWER BEAMWIDTH

CROSS-REFERENCE TO RELATED PATENT APPLICATION

This non-provisional application claims priority to and the benefit of, under 35 U.S.C. § 119(a), Taiwan Patent Application No. 112140927, filed Oct. 25, 2023 in Taiwan. The entire content of the above identified application is incorporated herein by reference.

FIELD

The present disclosure relates to an antenna system, and more particularly to an antenna system provided with at least one switching unit between rows of patch groups so that, through changing the turned-on and turned-off states of the at least one switching unit, the ground plane formed by the patch groups can have different electrical properties, and its horizontal half-power beamwidth (HPBW) can be changed.

BACKGROUND

The horizontal HPBW is an important parameter in the design of an antenna for wireless communication. HPBW describes an angular range in the main radiation direction of an antenna, or more particularly the angle through which the radiation intensity of the main lobe lowers from the peak value to one half thereof, or even more particularly the angle extending bilaterally from the main radiation direction to the points at which the radiation intensity is attenuated by 3 dB. A projection of this angle on a horizontal plane is referred to as a horizontal HPBW.

Generally, HPBW can be used to determine the area of effective signal coverage, or angular resolution. In order for an antenna system to have high efficiency and performance, it is typically required to maintain the HPBW at the desired angular value, the main reason being that an overly large HPBW (i.e., an excessively wide angular range of radiation in the main radiation direction of an antenna) will make signals spread over an unnecessarily extensive area that includes a non-target area, which, if happening, not only will cause a waste of energy, but also may lead to signal leakage that interferes with other wireless systems, causing the antenna system to put extra resources into addressing the interference issue and optimizing signal quality and therefore end up with poor overall performance. If on the other hand the HPBW is too small, meaning the antenna system has too narrow a coverage area, the reception of effective signals outside the HPBW is impossible, so the service area of the antenna system will be undesirably reduced. Moreover, too small an HPBW will increase the requirement for directional precision of the antenna system, making it necessary to frequently adjust the direction of the antenna system in order to ensure effective signal transmission and reception.

A conventional antenna is generally so designed that its physical structure or dimensions must be changed (e.g., by using a mechanical mechanism to switch the external configuration of the antenna or vary the shape of the housing of the antenna equipment) in order to adjust the HPBW and thereby change the radiation mode, the objective being to achieve the desired signal coverage area and data transfer efficiency. However, as the aforesaid design requires the antenna equipment to go through physical structural changes, such as adjustment in the antenna position and/or changes in the antenna direction or in the physical structure of the antenna, not only is it difficult to make real-time adjustment, but also human interference may be called for, which will result in a complex and time-consuming adjustment process involving highly complicated operations. Accordingly, one of the issues to be addressed in the present disclosure is to provide an effective solution to the foregoing technical inadequacies and enable more flexible and more convenient HPBW adjustment.

SUMMARY

Modern wireless communication products have higher demands in terms of one-to-one reception and multimedia broadcasting. However, traditional antenna equipment for horizontal HPBW adjustment has been associated with issues including adjustment difficulties, high costs and high design complexity. Accordingly, to stand out in such a highly competitive market, based on years of extensive practical experience in professional antenna design and the research spirit for excellence, and as a result of longtime labored research and experiment, an antenna system with a switchable horizontal HPBW is provided in the present disclosure, so as to offer better use experience to users and to conveniently and swiftly adjust the horizontal HPBW of an antenna for its use in different scenarios.

Certain aspects of the present disclosure are directed to an antenna system with a switchable horizontal HPBW. The antenna system includes a ground plane module, an antenna unit and a control module. The ground plane module includes a substrate having a first side and second side, at least one switching unit, a metal grounding element provided on the first side of the substrate, and first patch groups in rows. The rows of first patch groups are distributed on the second side of the substrate along a first axial direction, are respectively electrically connected to the metal grounding element, and jointly form a ground plane. Each two adjacent rows of the first patch groups are spaced apart by a first group distance and electrically connected to each other through the at least one switching unit. The antenna unit is spaced apart from the ground plane by an interval. The control module is electrically connected to the at least one switching unit and can control directly or indirectly each of the at least one switching unit to be turned on or turned off, receive at least one beam control message, and bring each of the at least one switching unit to be turned on or turned off according to contents of the at least one beam control message, so as to adjust the electrical properties of the ground plane and change the horizontal HPBW of the antenna unit. Accordingly, the antenna system has a relatively low-profile spatial property, and requires no extra mechanism design for horizontal HPBW adjustment and switching based on practical needs.

In certain embodiments, each of the first patch groups includes a plurality of first metal patch elements, each of the first metal patch elements is electrically connected to the metal grounding element, at least two of the first metal patch elements that are in the same row are spaced apart from each other by a first element distance and arranged along a second axial direction perpendicular or substantially perpendicular to the first axial direction, each two adjacent rows of the first patch groups are electrically connected to each other through a plurality of switching units, and each two of the first metal patch elements that are in two adjacent rows and corresponding to each other are electrically connected to each other by a corresponding one of the switching units.

In certain embodiments, each of the first metal patch elements is electrically connected to the metal grounding element through a corresponding first conductor portion.

In certain embodiments, the antenna system further includes at least one second patch group in at least one row that is distributed on the second side of the substrate along the first axial direction and electrically connected to the metal grounding element. At least one of the at least one row of the at least one second patch group is adjacent to and spaced apart by a second group distance from one of the first patch groups.

In certain embodiments, each of the at least one row of the at least one second patch group includes a plurality of second metal patch elements, each of the second metal patch elements is electrically connected to the metal grounding element through a corresponding second conductor portion, and at least two of the second metal patch elements that are in the same row are spaced apart from each other by a second element distance and arranged along the second axial direction.

In certain embodiments, the second group distance is equal or substantially equal to the first group distance.

In certain embodiments, the second element distance is equal or substantially equal to the first element distance.

In certain embodiments, each of the at least one switching unit is a diode, a high-electron-mobility transistor or a metal-oxide-semiconductor field-effect transistor.

In certain embodiments, the antenna unit is a dipole antenna or a patch antenna.

In certain embodiments, the interval is or substantially equals to 0.1 to 0.15 times the free-space wavelength corresponding to the operation frequency of the antenna unit.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION

Figure 1:
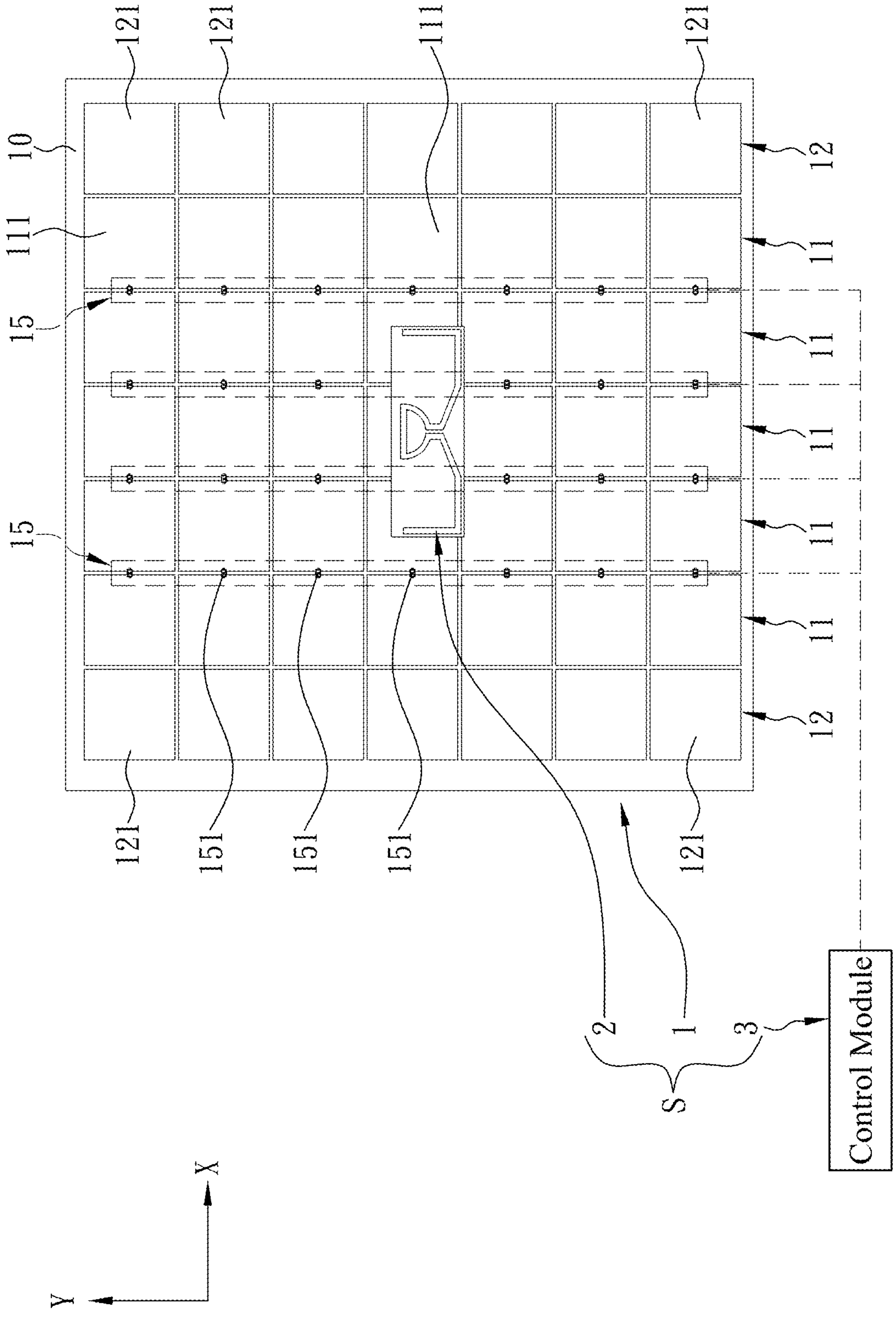
FIG. 1 is a schematic diagram of an antenna system as viewed from a first angle according to certain embodiments in the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of “a”, “an”, and “the” includes plural reference, and the meaning of “in” includes “in” and “on”. Titles or subtitles can be used herein for the convenience of a reader, which shall have no influence on the scope of the present disclosure.

The accompanying drawings are schematic and may not have been drawn to scale. The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as “first”, “second” or “third” can be used to describe various components, materials, objects, or the like, which are for distinguishing one component/material/object from another one only, and are not intended to, nor should be construed to impose any substantive limitations on the components, materials, objects, or the like. Directional terms (e.g., “front”, “rear”, “left”, “right”, “upper/top” and/or “lower/bottom”) are explanatory only and are not intended to be restrictive of the scope of the present disclosure.

As may be used herein, the term “substantially” refers to, for example, a value, or an average of values, in an acceptable deviation range of a particular value recognized or decided by a person of ordinary skill in the art, taking into account any specific quantity of errors related to the measurement of the value that may resulted from limitations of a measurement system or device. For example, “substantially” may indicate that the value is within, for example, ±5%, ±3%, ±1%, ±0.5% or ±0.1%, or one or more standard deviations, of the particular value.

Figure 2:
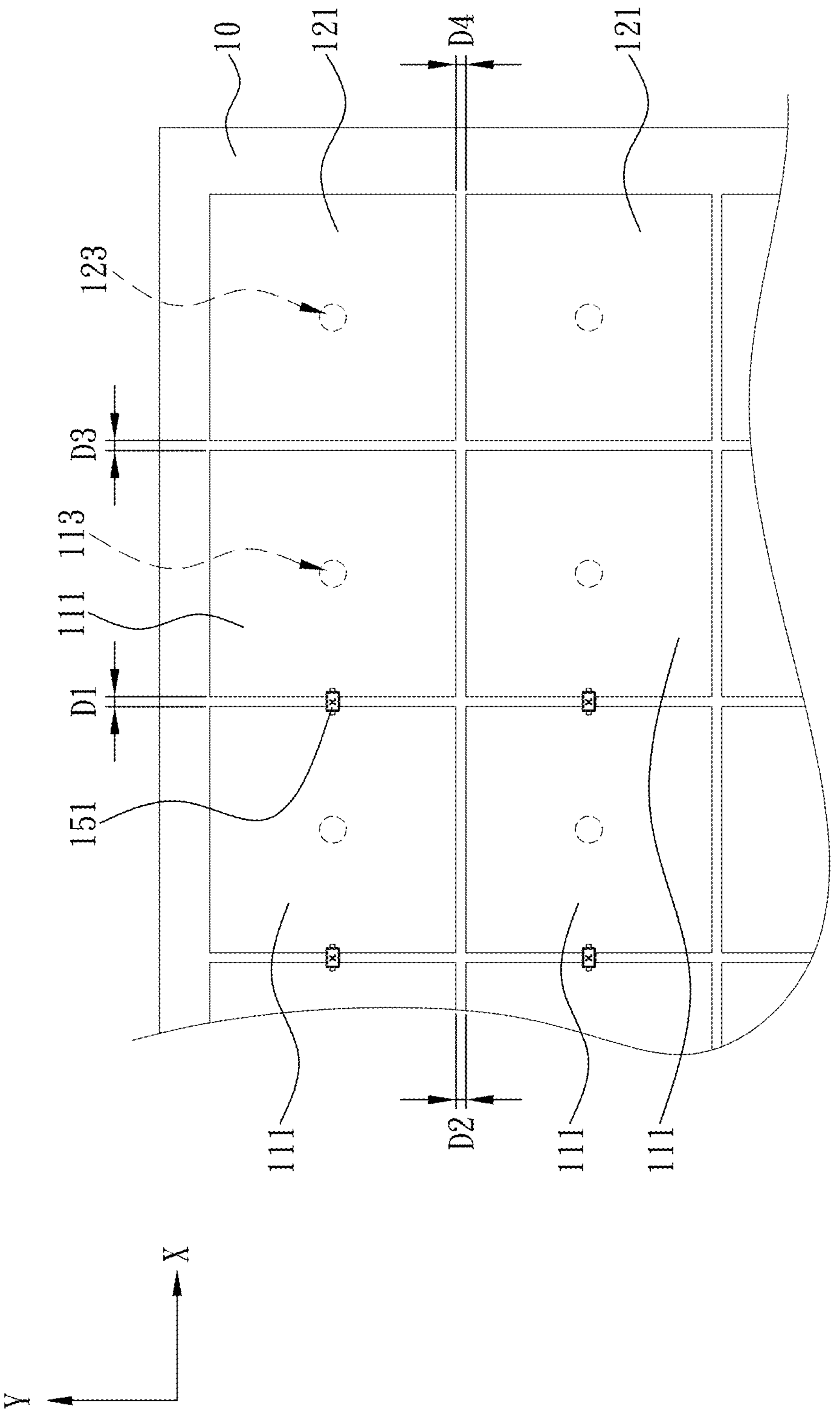
FIG. 2 is a schematic diagram showing an enlarged part of a ground plane module in FIG. 1 according to certain embodiments in the present disclosure.
Figure 3:
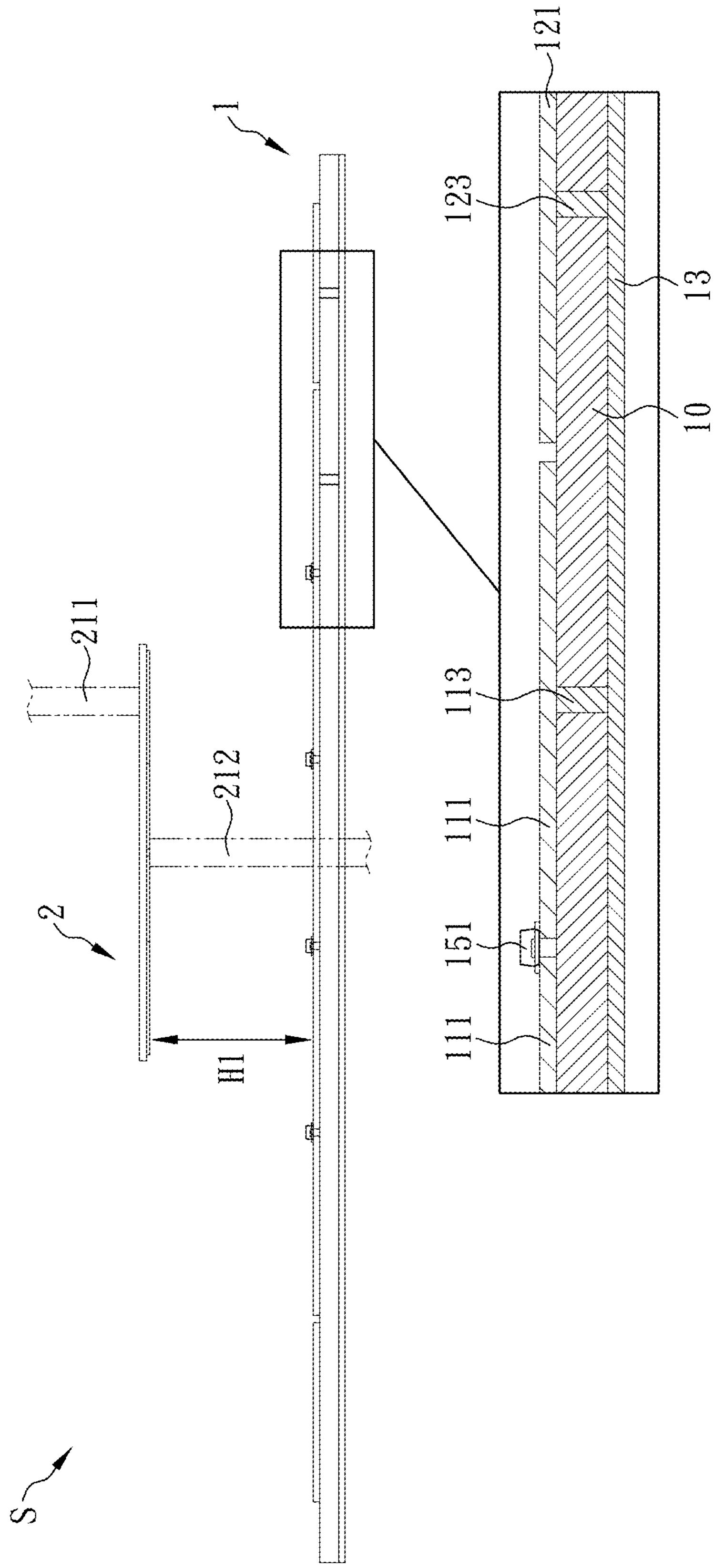
FIG. 3 is a schematic diagram of the antenna system as viewed from a second angle according to certain embodiments in the present disclosure.

Certain aspects of the present disclosure are directed to an antenna system having a switchable horizontal HPBW. Referring to FIG. 1 to FIG. 3, the antenna system S includes a ground plane module 1, an antenna unit 2, and a control module 3. The ground plane module 1 includes a substrate 10, which can be, but is not limited to, a fiberglass substrate (e.g., a FR4 substrate). In certain embodiments, as long as a substrate is made of a material or is a product of good electrical insulation capacity, it can be the substrate 10 defined in the present disclosure. The substrate 10 has a first side (e.g., a bottom side) provided with a metal grounding element 13. The substrate 10 further has a second side (e.g., a top side) on which first patch groups 11 in rows and second patch groups 12 in rows can be distributed along a first axial direction (e.g., an X-axis direction). In certain embodiments, the second patch groups 12 are located on the two lateral sides of the first patch groups 11. In FIG. 1, for example, an antenna system S is provided with five rows of first patch groups 11 and two rows of second patch groups 12, the first patch groups 11 are arranged in the middle concentratedly, one of the second patch groups 12 is provided on the left side of the first patch groups 11, and the other second patch group 12 is provided on the right side of the first patch groups 11. However, the present disclosure is not limited thereto, and in certain embodiments, the second patch group(s) may be omitted from the antenna system S, or one or more than two rows of the second patch group(s) 12 may be provided in the antenna system S.

With continued reference to FIG. 1 to FIG. 3, each first patch group 11 includes a plurality of first metal patch elements 111. The central portion of each first metal patch element 111 is provided with a first conductor portion 113, and each first conductor portion 113 can extend through the substrate 10 and be electrically connected to the metal grounding element 13. Each second patch group 12 includes a plurality of second metal patch elements 121. The central portion of each second metal patch element 121 is provided with a second conductor portion 123, and each second conductor portion 123 can extend through the substrate 10 and be electrically connected to the metal grounding element 13. However, the present disclosure is not limited thereto, and according to the practical product requirements, in certain embodiments a first patch group 11 can has only one first metal patch element 111; in certain embodiments a first metal patch element 111 can be electrically connected to the metal grounding element 13 through other structures; in certain embodiments the position of the first conductor portion 113 of each first metal patch element 111 can deviate from the center of the first metal patch element 111; and in certain embodiments, each first metal patch element 111 can be square, circular, rectangular, or of any other shapes. Similarly, the second patch groups 12 and the second metal patch elements 121 may have the foregoing variations.

Referring again to FIG. 1 to FIG. 3, each two adjacent first patch groups 11 are spaced apart by a first group distance D1, and the first metal patch elements 111 in the same row are arranged along a second axial direction (e.g., a Y-axis direction), wherein the second axial direction is perpendicular or substantially perpendicular to the first axial direction. Moreover, each two adjacent first metal patch elements 111 in the same row are spaced apart by a first element distance D2. In certain embodiments, the first element distance D2 is equal or substantially equal to the first group distance D1, but the first element distance D2 is not necessarily so designed. Each second patch group 12 that is adjacent to one of the first patch groups 11 is spaced apart from the first patch group 11 by a second group distance D3, and the second group distance D3 is equal or substantially equal to the first group distance D1 (but is not necessarily so). The second metal patch elements 121 in the same row are arranged along the second axial direction (e.g., the Y-axis direction), and each two adjacent second metal patch elements 121 in the same row are spaced apart by a second element distance D4. In certain embodiments, the second element distance D4 is equal or substantially equal to the second group distance D3 and/or the first element distance D2. However, the present disclosure is not limited thereto.

With continued reference to FIG. 1 to FIG. 3, each two adjacent rows of first patch groups 11 are electrically connected by a switching unit assembly 15, but no switching unit assembly 15 is provided between each pair of adjacent first and second patch groups 11 and 12. In other words, if a switching unit assembly 15 is provided between two adjacent rows of patch groups, these two rows of patch groups are first patch groups 11 referred to in the present disclosure; and if two adjacent rows of patch groups are not provided therebetween with a switching unit assembly 15, at least one of these two rows of patch groups is a second patch group 12 referred to in the present disclosure. Each switching unit assembly 15 can include one or more switching units 151. In certain embodiments, each two corresponding first metal patch elements 111 in two adjacent rows are electrically connected to each other by a switching unit 151, and all the switching units 151 between two adjacent rows of first patch groups 11 are of the same switching unit assembly 15. In FIG. 1, for example, the switching units 151 arranged along the second axial direction (e.g., the Y-axis direction) between two adjacent rows of first patch groups 11 are of the same switching unit assembly 15. However, the present disclosure is not limited thereto, and in certain embodiments all the first metal patch elements 111 of two adjacent rows of first patch groups 11 can be electrically connected to a single switching unit 151. A switching unit 151 can be a diode (e.g., a PIN diode), a switch (e.g., a high-electron-mobility transistor (HEMT), a metal-oxide-semiconductor field-effect transistor (MOSEFT), etc.), etc. When a switching unit 151 is in the turned-on state, the two adjacent first metal patch elements 111 are electrically connected; and when the switching unit 151 enters the turned-off state, the electrical connection between the two adjacent first metal patch elements 111 is cut off. Accordingly, bringing each switching unit 151 into the turned-on state or the turned-off state will make or break the electrical connection between the two adjacent first metal patch elements 111, and the electric current distribution in the first metal patch elements 111 will be changed as a result, thereby adjusting the electrical properties of the ground plane formed jointly by the first patch groups 11.

With continued reference to FIG. 1 to FIG. 3, the antenna unit 2 can be spaced apart from the ground plane of the ground plane module 1 by an interval H1. More specifically, the antenna unit 2 is spaced apart from the exposed surfaces of the first metal patch elements 111 by the interval H1. According to product requirements, an antenna unit 2 can be a dipole antenna, patch antenna, etc. The interval H1 can be or substantially equal to 0.1 to 0.15 times the free-space wavelength $\lambda_0$ corresponding to the operation frequency of the antenna unit 2 (i.e., 0.1-0.15$\lambda_0$). In certain embodiments, the antenna unit 2 can be provided on a mechanism member 211 and/or 212 so as to be spaced apart from the ground plane module 1 by the interval H1. In certain embodiments, the mechanism member 211 can be provided on a housing such that the antenna unit 2 is suspended above the top side of the ground plane module 1. In certain embodiments, the mechanism member 212 can extend through the substrate 10 and protrude beyond the top side of the substrate 10 to keep the antenna unit 2 from direct electrical connection with any element (e.g., a first metal patch element 111) of the ground plane module 1.

With continued reference to FIG. 1 to FIG. 3, the control module 3 can be electrically connected to each switching unit assembly 15 and configured to control (i.e., to turn on and off) directly or indirectly the at least one switching unit 151 of each switching unit assembly 15. For example, the control module 3 can be configured to bring the switching units 151 in an entire row into the turned-on state (which is equivalent to bringing the corresponding switching unit assembly 15 into the turned-on state), bring the switching units 151 in an entire row into the turned-off state (which is equivalent to bringing the corresponding switching unit assembly 15 into the turned-off state), bring some of the switching units 151 in a row into the turned-on state while leaving the other switching units 151 in the same row in the turned-off state, etc. In addition, the control module 3 is configured to receive at least one beam control message and according to the contents of the beam control message bring some of the switching unit assemblies 15 into the turned-on state (i.e., bringing all the switching unit(s) 151 in such switching unit assembl(ies) 15 into the turned-on state) and leave the other switching unit assembl(ies) 15 in the turned-off state (i.e., leaving all the switching unit(s) 151 in such switching unit assembl(ies) 15 in the turned-off state) in order to change the horizontal HPBW of the antenna unit 2. For example, when operating for the first time, the antenna system S can detect a received signal strength indicator (RSSI) and generate a beam control message corresponding to the value of the RSSI in order for the control module 3 to adjust the turned-on/off state of each switching unit 151 until the RSSI reaches the desired value. However, the present disclosure is not limited thereto and a manufacturer can adjust the contents of a beam control message according to product requirements. In certain embodiments, a specific chip or circuit can be utilized in the antenna system S to produce the beam control message. However, such a specific chip or circuit can also be integrated in the control module 3, and accordingly the scenario described supra of the control module 3 receiving a beam control message also encompasses a configuration in which the control module 3 itself produces the beam control message.

In certain embodiments, the antenna unit 2 is a dipole antenna working at 2.4 GHz. Referring again to FIG. 1 to FIG. 3, the dimensions of the substrate 10 can be 113 mm by 117 mm, and the antenna unit 2 corresponds in position approximately to a central region of the substrate 10, with the interval H1 between the antenna unit 2 and the ground plane module 1 being 14.37 mm (about $0.12\lambda_0$). Besides, the ground plane module 1 can have five rows of first patch groups 11, two rows of second patch groups 12, and four rows of switching unit assemblies 15, wherein: as viewed from the viewing angle of FIG. 1, the first patch groups 11 can be sequentially defined, from left to right, as the first-row first patch group 11, the second-row first patch group 11, the third-row first patch group 11, the fourth-row first patch group 11, and the fifth-row first patch group 11; and the second patch groups 12 can be sequentially defined, from left to right, as the first-row second patch group 12 and the second-row second patch group 12, with the first-row second patch group 12 located on the left side of the first-row first patch group 11, and the second-row second patch group 12 on the right side of the fifth-row first patch group 11. The switching unit assemblies 15 can be sequentially defined, from left to right, as the first-row switching unit assembly 15, the second-row switching unit assembly 15, the third-row switching unit assembly 15, and the fourth-row switching unit assembly 15.

Figure 4B:
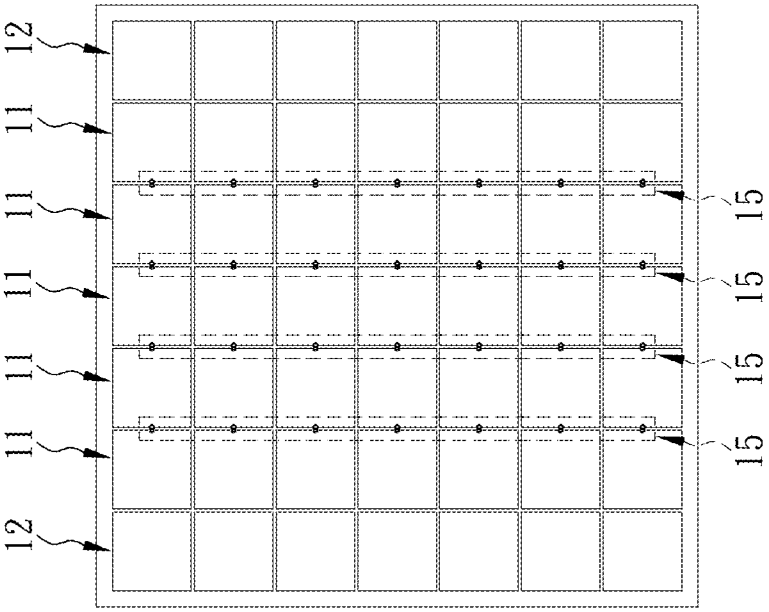
FIG. 4B is a schematic diagram showing a ground plane in a Case 2 configuration that is formed by a ground plane module according to certain embodiments in the present disclosure.
Figure 4A:
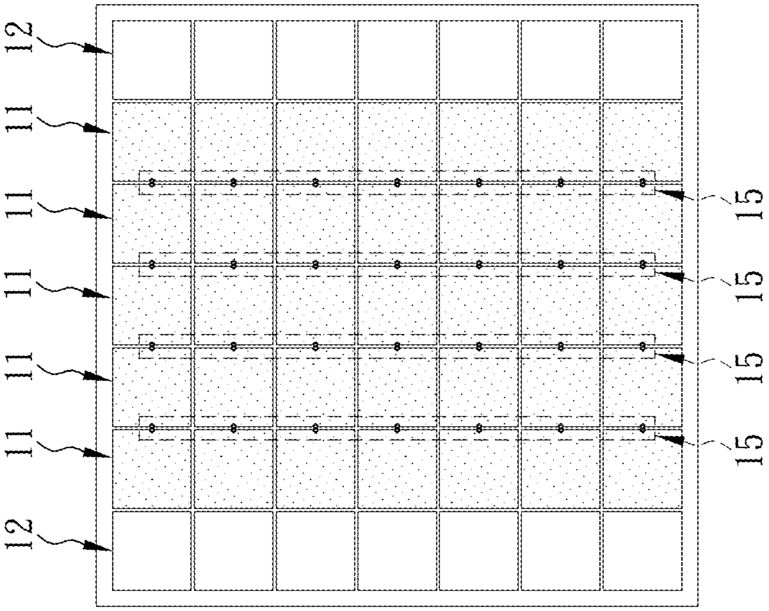
FIG. 4A is a schematic diagram showing a ground plane in a Case 1 configuration that is formed by a ground plane module according to certain embodiments in the present disclosure.
Figure 4D:
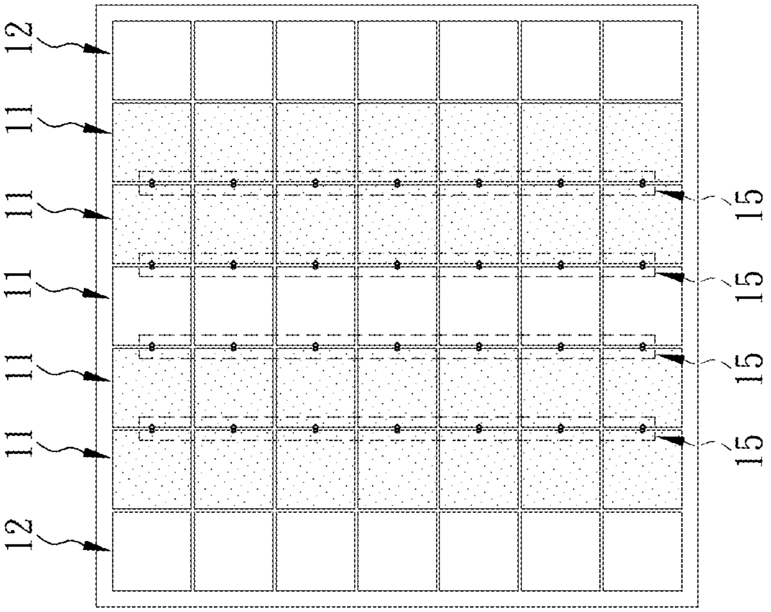
FIG. 4D is a schematic diagram showing a ground plane in a Case 4 configuration that is formed by a ground plane module according to certain embodiments in the present disclosure.
Figure 4C:
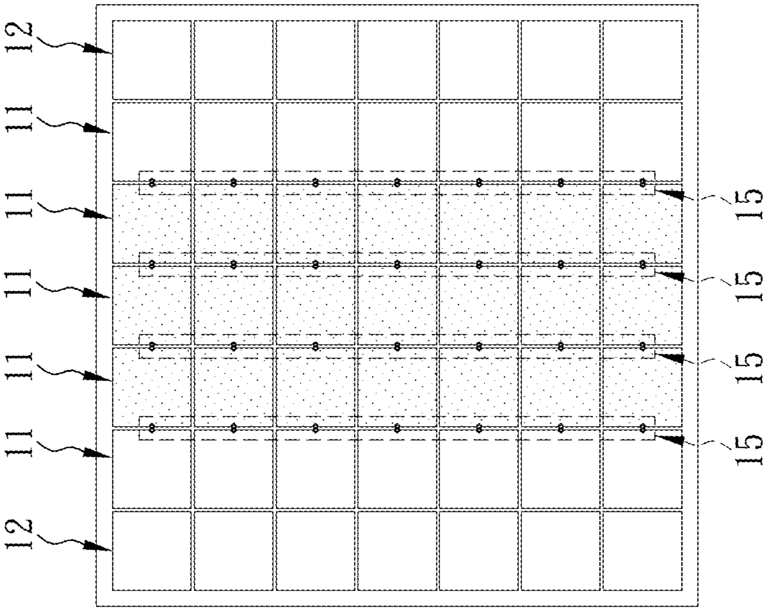
FIG. 4C is a schematic diagram showing a ground plane in a Case 3 configuration that is formed by a ground plane module according to certain embodiments in the present disclosure.
Figure 5:
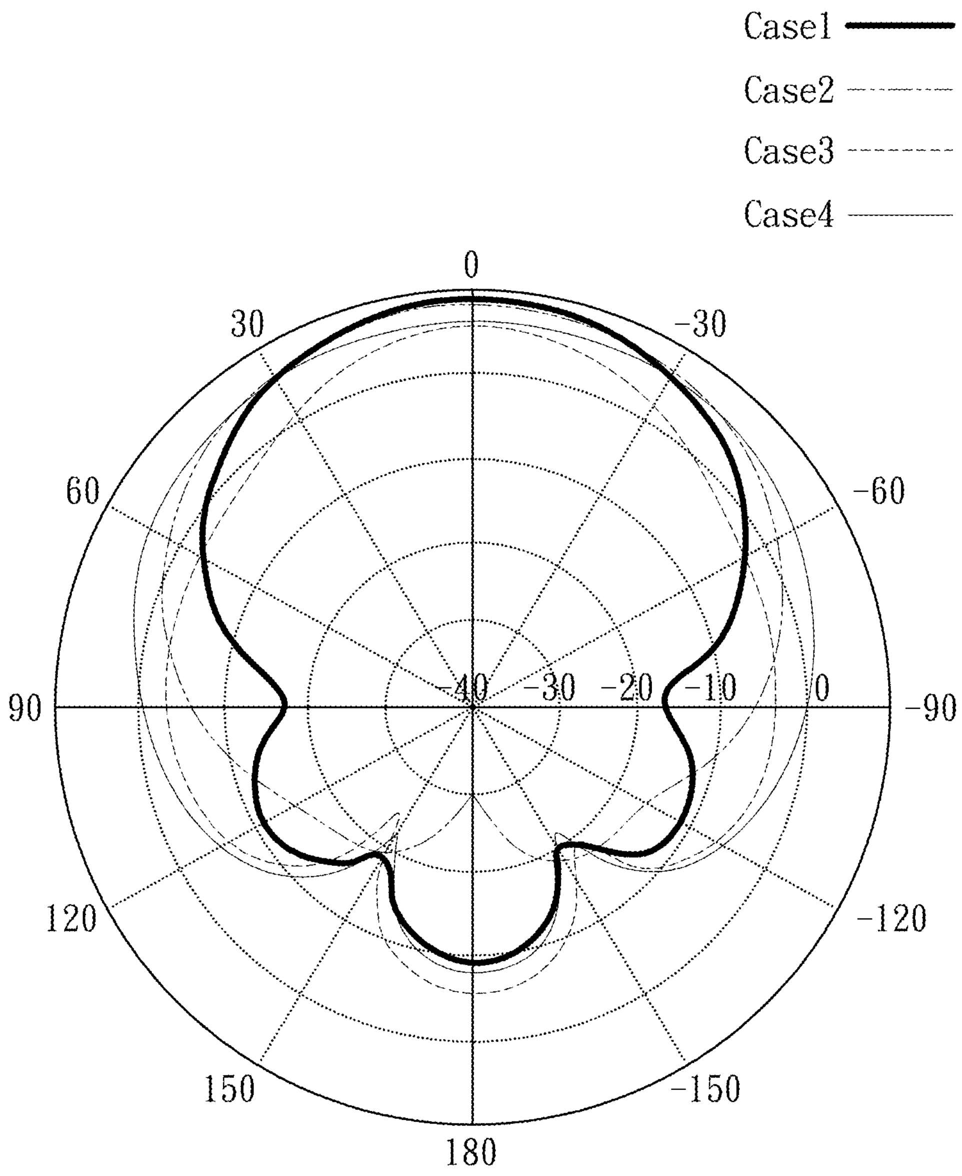
FIG. 5 is a pattern diagram of the antenna system according to certain embodiments of the present disclosure.

With continued reference to FIG. 1 to FIG. 3, in certain embodiments, the dimensions of each first metal patch element 111 and each second metal patch element 121 can be 14.9 mm by 14.9 mm, each first conductor portion 113 (e.g., metal via) electrically connected to the metal grounding element 13 can have a diameter of 0.8 mm, the first element distance D2 as well as the first group distance D1 between each two adjacent first metal patch elements 111 can be 0.6 mm, the second group distance D3 between each pair of adjacent first and second metal patch elements 111 and 121 can be 0.6 mm, and the second element distance D4 between each two adjacent second metal patch elements 121 can be 0.6 mm. Referring to FIG. 4A to FIG. 4D, when a certain switching unit assembly 15 is in the turned-on state, the two rows of first patch groups 11 connected thereto are shown as shaded with dots. If no other switching unit assemblies 15 are in the turned-on state at the same time, the first metal patch elements 111 in all the other first patch groups 11 will be left blank in the drawings as will the second metal patch elements 121. In FIG. 4A, the first-row to the fourth-row switching unit assemblies 15 are all in the turned-on state. In FIG. 4B, the first-row to the fourth-row switching unit assemblies 15 are all in the turned-off state. In FIG. 4C, the second-row and the third-row switching unit assemblies 15 are in the turned-on state while the first-row and the fourth-row switching unit assemblies 15 are in the turned-off state. In FIG. 4D, the first-row and the fourth-row switching unit assemblies 15 are in the turned-on state while the second-row and the third-row switching unit assemblies 15 are in the turned-off state. Referring to FIG. 5, the ground plane configuration formed in FIG. 4A (i.e., Case 1) gives the antenna unit 2 a horizontal HPBW of 60 degrees, the ground plane configuration formed in FIG. 4B (i.e., Case 2) gives the antenna unit 2 a horizontal HPBW of 79 degrees, the ground plane configuration formed in FIG. 4C (i.e., Case 3) gives the antenna unit 2 a horizontal HPBW of 53 degrees, and the ground plane configuration formed in FIG. 4D (i.e., Case 4) gives the antenna unit 2 a horizontal HPBW of 126 degrees. In other words, the ground plane adjustment mechanism of the ground plane module 1 allows the horizontal HPBW of the antenna unit 2 to be adjusted in a range from about 53 degrees to about 126 degrees.

Figure 6:
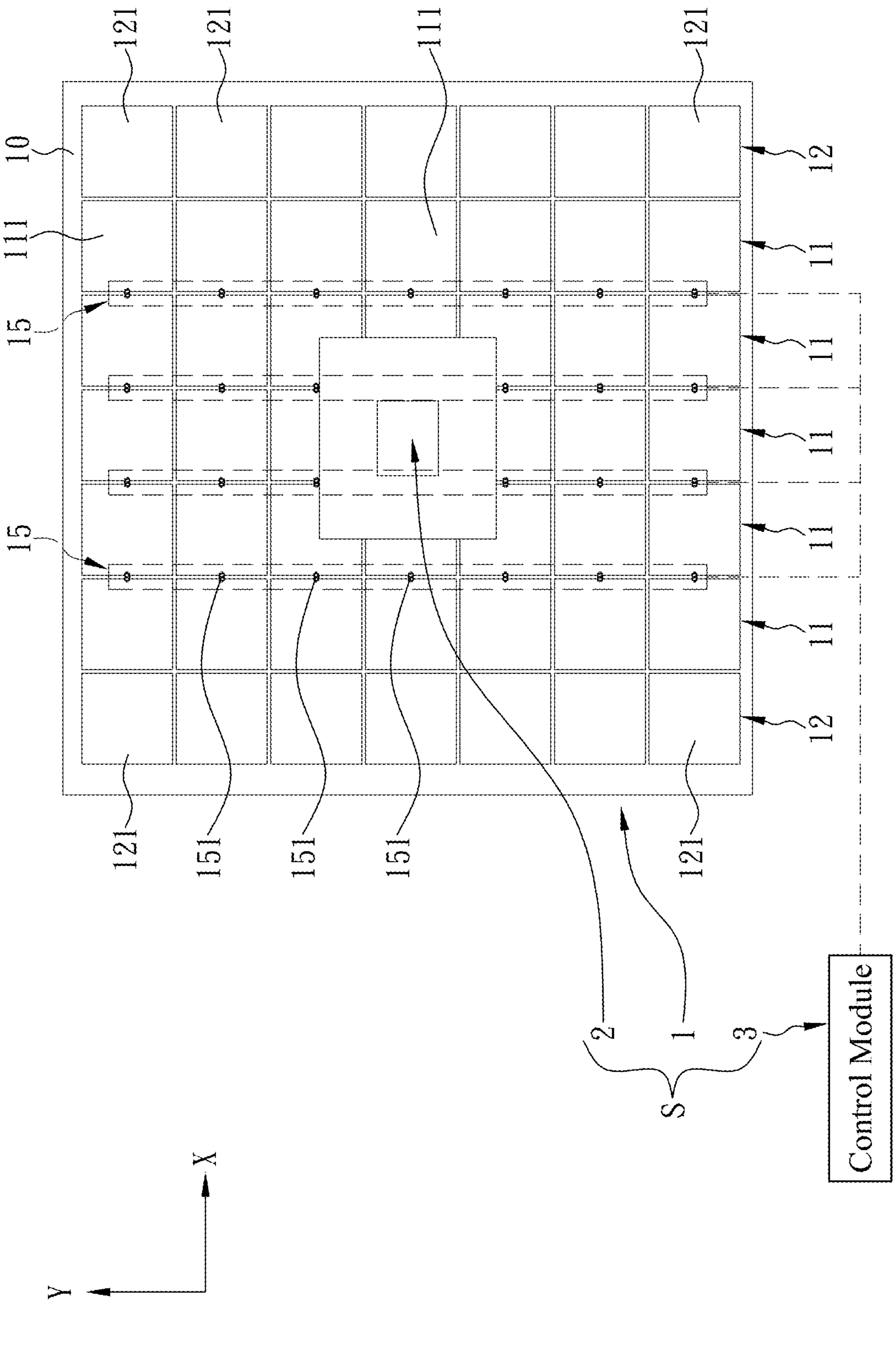
FIG. 6 is a schematic diagram of an antenna system as viewed from the first angle according to certain embodiments in the present disclosure.
Figure 7:
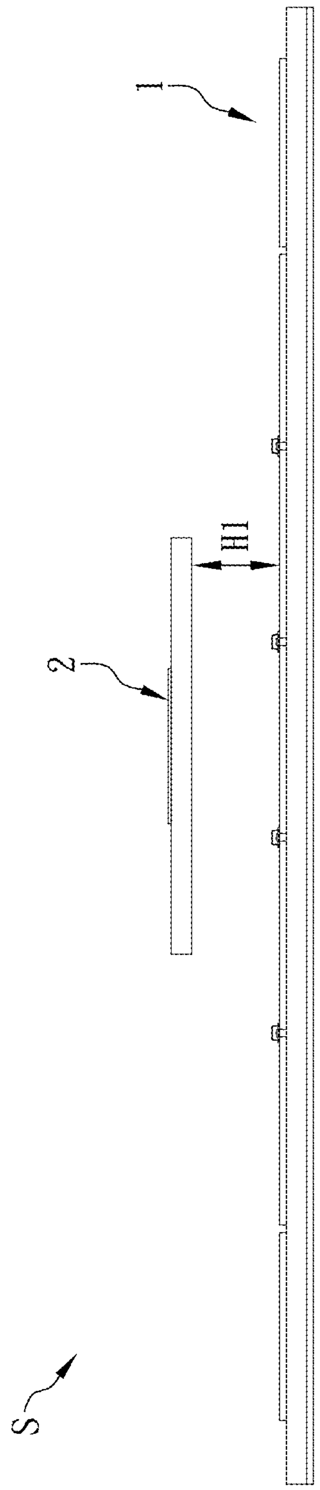
FIG. 7 is a schematic diagram of the antenna system as viewed from the second angle according to certain embodiments in the present disclosure.
Figure 8:
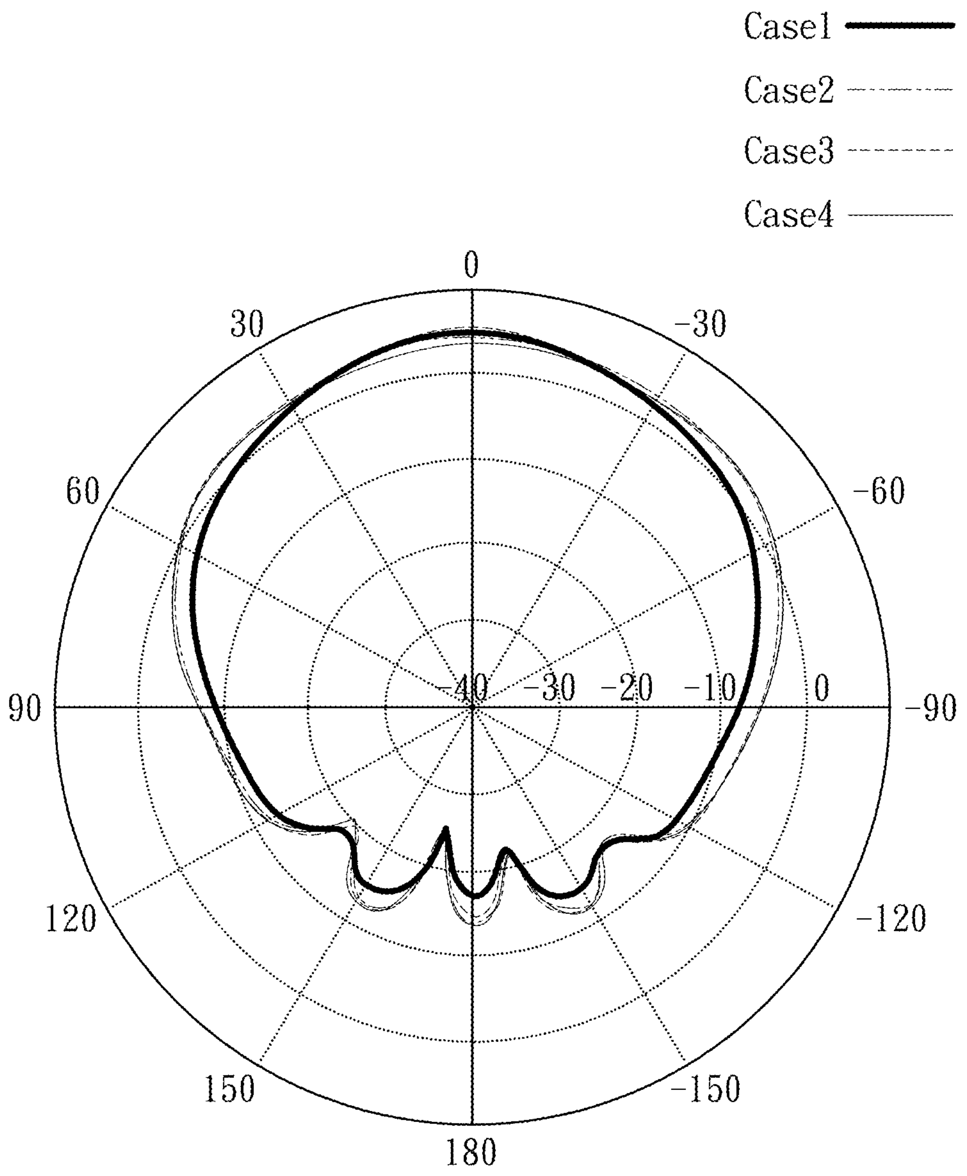
FIG. 8 is a pattern diagram of the antenna system according to certain embodiments of the present disclosure.

Referring to FIG. 6 and FIG. 7, in certain embodiments, the antenna unit 2 is a patch antenna working at 5 GHz, the ground plane module 1 and the components thereof (e.g., the substrate 10, first patch groups 11, second patch groups 12, switching unit assemblies 15, etc.) are arranged and have the dimensions the same as those in the embodiments exemplarily shown in FIGS. 1-3, and the antenna unit 2 corresponds in position approximately to a central region of the substrate 10, with the interval H1 between the antenna unit 2 and the ground plane module 1 being 7 mm (about $0.13\lambda_0$). Referring to FIG. 8, the ground plane configuration formed in FIG. 4A (i.e., Case 1) gives the antenna unit 2 in FIG. 6 and FIG. 7 a horizontal HPBW of 57 degrees, the ground plane configuration formed in FIG. 4B (i.e., Case 2) gives the same antenna unit 2 a horizontal HPBW of 117 degrees, the ground plane configuration formed in FIG. 4C (i.e., Case 3) gives the same antenna unit 2 a horizontal HPBW of 123 degrees, and the ground plane configuration formed in FIG. 4D (i.e., Case 4) gives the same antenna unit 2 a horizontal HPBW of 94 degrees. In other words, the ground plane adjustment mechanism of the ground plane module 1 allows the horizontal HPBW of the antenna unit 2 in FIG. 6 and FIG. 7 to be adjusted in a range from about 57 degrees to about 123 degrees.

According to the above, referring back to FIG. 1 to FIG. 3, the structure of the antenna system S according to the present disclosure as a whole has a relatively low-profile spatial property thanks to the relatively small interval H1 between the antenna unit 2 and the ground plane module 1, and the turned-on and turned-off states of the switching unit assemblies 15 or of the switching units 151 can be changed to adjust the horizontal HPBW of the antenna unit 2, thereby achieving the desired signal coverage area and data transfer efficiency without need to make additional changes to the mechanical structure of the antenna system S. Accordingly, the antenna system S will not take up too much design space and has higher flexibility in adjustment.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An antenna system with a switchable horizontal half-power beamwidth, comprising:

a ground plane module comprising:

a substrate having a first side and second side;

at least one switching unit;

a metal grounding element provided on the first side of the substrate; and first patch groups in rows that are distributed on the second side of the substrate along a first axial direction, are respectively electrically connected to the metal grounding element, and jointly form a ground plane, wherein each two adjacent rows of the first patch groups are spaced apart by a first group distance and electrically connected to each other through the at least one switching unit;

an antenna unit spaced apart from the ground plane by an interval; and a control module electrically connected to the at least one switching unit and configured to control directly or indirectly each of the at least one switching unit to be turned on or turned off, receive at least one beam control message, and bring each of the at least one switching unit to be turned on or turned off according to contents of the at least one beam control message, so as to adjust electrical properties of the ground plane and change a horizontal half-power beamwidth of the antenna unit.

2. The antenna system according to claim 1, wherein each of the first patch groups comprises a plurality of metal patch elements, each of the metal patch elements is electrically connected to the metal grounding element, at least two of the metal patch elements that are in the same row are spaced apart from each other by an element distance and arranged along a second axial direction perpendicular or substantially perpendicular to the first axial direction, each two adjacent rows of the first patch groups are electrically connected to each other through a plurality of switching units, and each two of the metal patch elements that are in two adjacent rows and corresponding to each other are electrically connected to each other by a corresponding one of the switching units.

3. The antenna system according to claim 2, wherein each of the metal patch elements is electrically connected to the metal grounding element through a corresponding conductor portion.

4. The antenna system according to claim 1, further comprising at least one second patch group in at least one row that is distributed on the second side of the substrate along the first axial direction and electrically connected to the metal grounding element, wherein at least one of the at least one row of the at least one second patch group is adjacent to and spaced apart by a second group distance from one of the first patch groups.

5. The antenna system according to claim 4, wherein each of the at least one row of the at least one second patch group comprises a plurality of metal patch elements, each of the metal patch elements is electrically connected to the metal grounding element through a corresponding conductor portion, and at least two of the metal patch elements that are in the same row are spaced apart from each other by an element distance and arranged along a second axial direction perpendicular or substantially perpendicular to the first axial direction.

6. The antenna system according to claim 4, wherein the second group distance is equal or substantially equal to the first group distance.

7. The antenna system according to claim 5, wherein each of the first patch groups comprises a plurality of metal patch elements, at least two of the metal patch elements of each of the first patch groups that are in the same row are spaced apart from each other by an element distance, and the element distance spacing apart the at least two of the metal patch elements of each of the at least one second patch group is equal or substantially equal to the element distance spacing apart the at least two of the metal patch elements of each of the first patch groups.

8. The antenna system according to claim 1, wherein each of the at least one switching unit is a diode, a high-electron-mobility transistor or a metal-oxide-semiconductor field-effect transistor.

9. The antenna system according to claim 1, wherein the antenna unit is a dipole antenna or a patch antenna.

10. The antenna system according to claim 1, wherein the interval is or substantially equals to 0.1 to 0.15 times a free-space wavelength corresponding to an operation frequency of the antenna unit.

* * * * *